United States Patent
Roth

(10) Patent No.: US 8,217,947 B2
(45) Date of Patent: Jul. 10, 2012

(54) TEXT-READING SUPPORT ON HANDHELD DEVICES AND DEVICES WITH SMALL DISPLAYS

(75) Inventor: Volker Roth, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 802 days.

(21) Appl. No.: 12/208,030

(22) Filed: Sep. 10, 2008

(65) Prior Publication Data

US 2009/0189904 A1    Jul. 30, 2009

Related U.S. Application Data

(60) Provisional application No. 61/023,384, filed on Jan. 24, 2008.

(51) Int. Cl.
*G06T 11/00* (2006.01)
*G09G 5/00* (2006.01)
*G06F 17/00* (2006.01)

(52) U.S. Cl. ........ 345/467; 345/684; 345/169; 715/204; 715/245; 715/864

(58) Field of Classification Search .................. 345/467, 345/169, 504, 684; 715/204, 245, 284, 864, 715/220; 725/44
See application file for complete search history.

(56) References Cited

U.S. PATENT DOCUMENTS

| | | | |
|---|---|---|---|
| 5,485,174 A * | 1/1996 | Henshaw et al. | 345/684 |
| 5,559,938 A * | 9/1996 | Van Roekel et al. | 345/441 |
| 7,146,562 B2 * | 12/2006 | Janssen | 715/220 |
| 2002/0075335 A1 * | 6/2002 | Rekimoto | 345/864 |
| 2002/0158876 A1 * | 10/2002 | Janssen | 345/504 |
| 2005/0052413 A1 * | 3/2005 | Ueno | 345/158 |
| 2005/0243104 A1 * | 11/2005 | Kinghorn | 345/649 |
| 2006/0017692 A1 * | 1/2006 | Wehrenberg et al. | 345/156 |
| 2006/0038796 A1 | 2/2006 | Hinckley et al. | |
| 2007/0205991 A1 * | 9/2007 | Gloyd et al. | 345/169 |
| 2007/0288844 A1 * | 12/2007 | Zingher et al. | 715/529 |
| 2008/0204452 A1 * | 8/2008 | Lau | 345/419 |
| 2008/0222518 A1 * | 9/2008 | Walker | 715/245 |
| 2008/0294974 A1 * | 11/2008 | Nurmi et al. | 715/204 |
| 2009/0022426 A1 * | 1/2009 | Yamazaki | 382/296 |
| 2010/0050113 A1 * | 2/2010 | Winter | 715/784 |
| 2010/0180304 A1 * | 7/2010 | Hassell et al. | 725/44 |

* cited by examiner

*Primary Examiner* — Chante Harrison
(74) *Attorney, Agent, or Firm* — Sughrue Mion, PLLC

(57) ABSTRACT

One aspect of the invention relates to techniques for increasing the displayable font size while retaining a wide text line of information on small information displays. In one embodiment, the inventive technique leverages the wider diagonal (in device dimensions) for text viewing and combine this form of display with a horizontal (in text dimensions) scrolling feature i.e. scrolling text along the diagonal of the device's display. Vertical context (in text dimensions) is maintained by adding a constant-offset look-ahead and look-back line above the primary diagonal focus area. Another embodiment bends the text along two edges of the display area to leverage the fact that the lengths of the two sides are even longer than the length of the screen diagonal. In both configurations, one can retain a large font size without sacrificing the number of characters displayed per line.

25 Claims, 5 Drawing Sheets

Figure 2

TEXT-READING SUPPORT ON HANDHELD DEVICES AND DEVICES WITH SMALL DISPLAYS

CROSS-REFERENCE TO RELATED APPLICATION

This regular U.S. patent application is based on and claims the benefit of priority under 35 U.S.C. 119 from provisional U.S. patent application Ser. No. 61/023,384, filed on Jan. 24, 2008, the entire disclosure of which is incorporated by reference herein.

DESCRIPTION OF THE INVENTION

1. Field of the Invention

This invention generally relates to presenting information on information displays and more specifically to using displays of small size to render textual information in a format convenient for reading by a user.

2. Background of the Invention

The size limitations of ultra-portable hand-held devices, such as cell phones or PDAs limit the screen area available for viewing information. This makes it hard to read textual information using such a device. Various solutions to this problem are being developed in the industry.

As a typesetting rule of thumb, the width of a column of text should be about twice the size of the alphabet, or 52 characters. This poses challenges for reading text on handheld devices that, due to their small size, have limited screen "real estate" available for text rendering. Consequently, either the number of characters shown per line must be reduced or the font size has to be reduced. Neither of these solutions lead to a comfortable reading experience. Apple compensates for the limited size of the iPhone screen by allowing the user to read text in "horizontal mode". When rotated by 90°, the iPhone rotates and scales the screen display such that the displayed information is aligned with and fits the larger vertical screen axis. This trades vertical context for horizontal resolution. Even then, text often appears in too small a font size for it to be readable.

Thus, the conventional industry approaches are deficient in their ability to facilitate efficient display of information on small information displays for easy reading by the user.

SUMMARY OF THE INVENTION

The inventive methodology is directed to methods and systems that substantially obviate one or more of the above and other problems associated with conventional techniques for displaying of information on small information displays.

One aspect of the invention relates to techniques for increasing the displayable font size while retaining a wide text line of information on small information displays. In one embodiment, the inventive technique leverages the wider diagonal (in device dimensions) for text viewing and combine this form of display with a horizontal (in text dimensions) scrolling feature i.e. scrolling text along the diagonal of the device's display. Vertical context (in text dimensions) is maintained by adding a constant-offset look-ahead and look-back, line above the primary diagonal focus area. Another embodiment bends the text along two edges of the display area to leverage the fact that the lengths of the two sides are even longer than the length of the screen diagonal. In both configurations, one can retain a large font size without sacrificing the number of characters displayed per line.

In accordance with one embodiment of the inventive technique, there is provided a method involving rendering a text for display on a display device. In accordance with the inventive method, the text is rendered on the display device in parallel to a diagonal of the display device.

In accordance with another embodiment of the inventive technique, there is provided a computer readable medium embodying a set of instructions, the set of instructions, when executed by one or more processors causing the one or more processors to render a text for display on a display device in parallel to a diagonal of the display device.

In accordance with yet another embodiment of the inventive technique, there is provided a computerized system comprising a display device, a central processing unit and a memory storing a set of instructions, the set of instructions, when executed by the central processing unit causing the central processing unit to render a text for display on a display device in parallel to a diagonal of the display device.

In accordance with yet another embodiment of the inventive technique, there is provided a mobile device, incorporating a display, a sensing unit operable to sense a user input, a processing unit operable to process the user input, and a display controller, rendering a text on the display device in parallel to a diagonal of the display.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 illustrates how sliding Windows and context look ahead and look back is applied to the diagonal display.

DETAILED DESCRIPTION

In the following detailed description, reference will be made to the accompanying drawings, in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. Therefore, the following detailed description is not to be construed in a limited sense. Additionally, the various embodiments of the invention as described may be implemented in the form of software running on a general purpose computer, in the form of a specialized hardware, or combination of software and hardware.

On handheld devices with comparatively small screens, display area is at a premium. In order to read text on such a device, usually one has to trade font size for the line width displayed. It is common for mobile devices to operate both in vertical and horizontal (landscape) reading mode to maximize the horizontal width available for font scaling. Often, the amount of context displayed in vertical direction is reduced by this approach.

One embodiment of the inventive concept is based on the insight that the diagonal of a square is the square root of 2 or about 1.41 times longer than its vertical or horizontal size, which is a gain of more than 40% in width. For rectangles, the diagonal is the square root of a^2+b^2 where a and b are the lengths of its sides. Therefore, to capitalize on this increased linear size of the diagonal, an embodiment of the present invention renders text along the diagonal of the device's display (the "focus line") as shown, for example, in FIG. 1.

Figure 1:
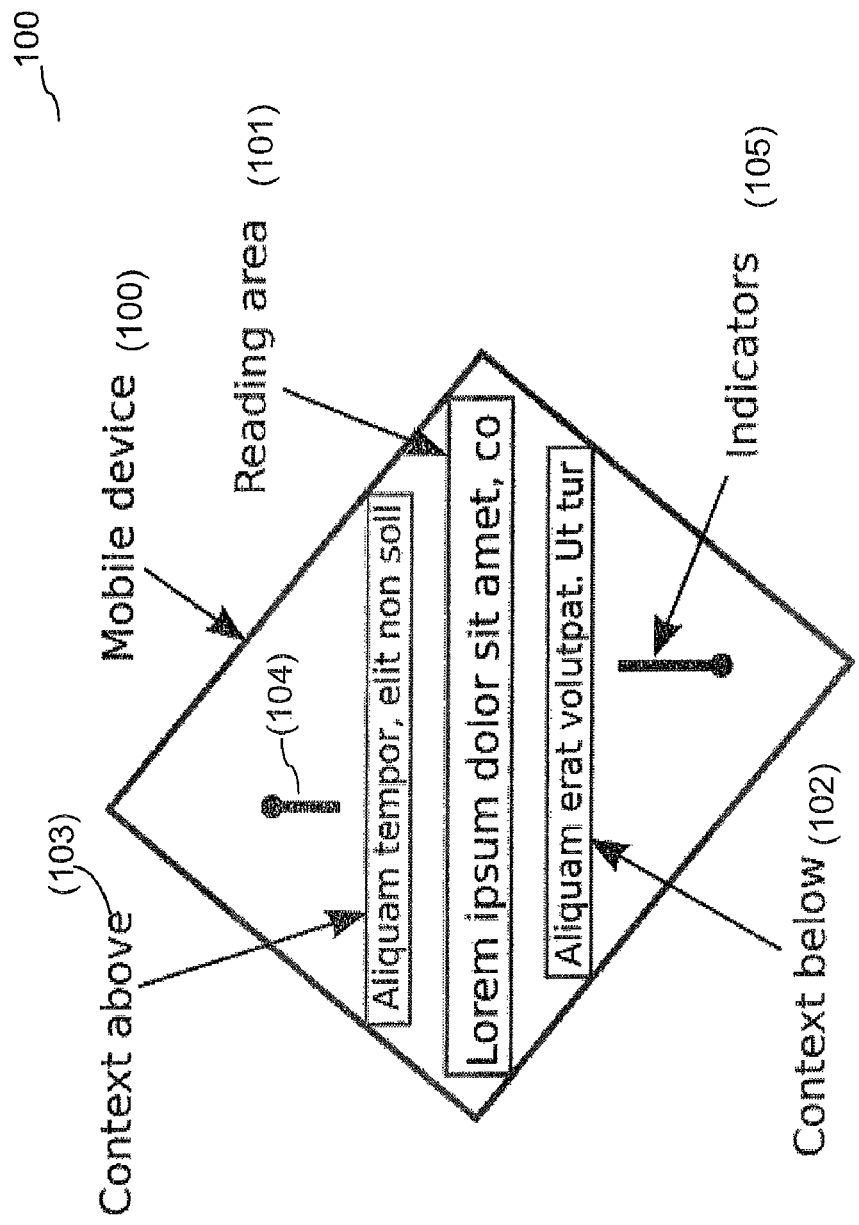
FIG. 1 illustrates how text is rendered on a handheld device with look ahead, look back and overall text position indicators.

As shown in FIG. 1, the display mobile device 100 includes a horizontal reading area (focus line) 101, which serves as a primary area for displaying and reading text. The rendering of the text in the display device as shown in FIG. 1 requires that the user holds the device at a suitable angle for easy viewing. It should be noted that holding a viewing device with one hand at an angle is more convenient for a user because the human anatomy is such that one-handed horizontal or vertical alignment of a rectangular screen with our viewing axis is less comfortable than holding the device at an angle.

In one embodiment of the invention, as the user reads the text, the text is being scrolled such that the user always focuses on the text displayed along the diagonal line of the display, which is called the user focus line. In one embodiment of the invention, the scrolling is performed automatically, with a predetermined speed. In another embodiment of the invention, the speed of the scrolling can be adjusted by the user. The user may also be able to pause and resume the scrolling by using an appropriate gesture, such as by tapping on the display screen.

For easy reading, one embodiment of the inventive technique scrolls through the text horizontally (diagonally in device coordinates) e.g., by using dragging or flicking gestures on the device. Alternatively, tilting gestures can be utilized if the device supports appropriate sensing e.g. by means of accelerometers. This technique is particularly applicable once a user has decided that he or she wishes to read a longer text rather than glancing over it.

Figure 2:
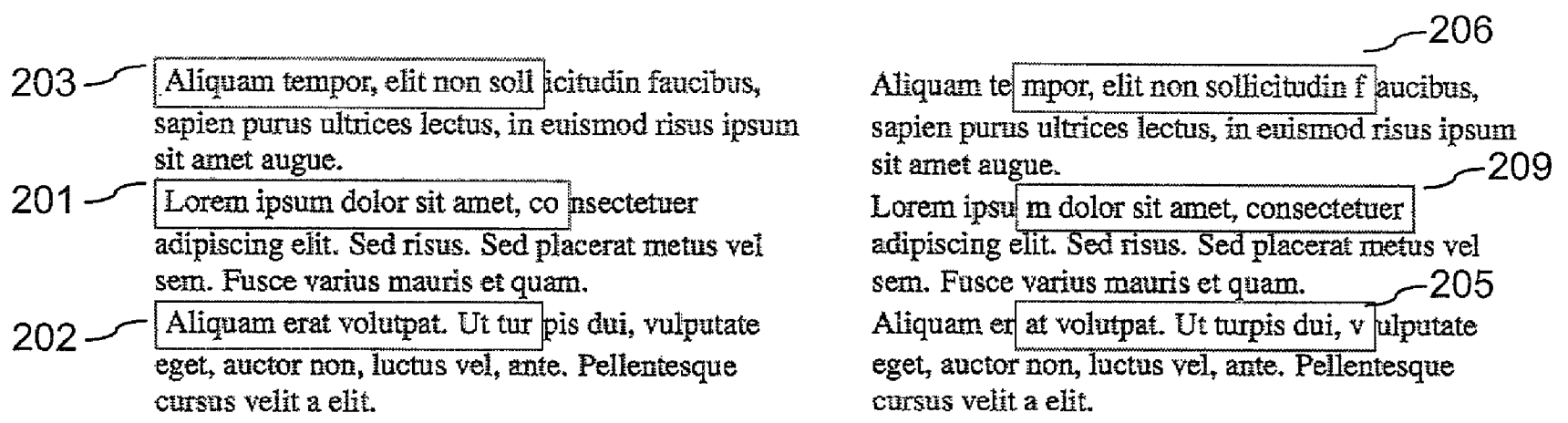

However, even if a user reads a continuous text, the user often tends to skip or gloss over sections of it. In order to support this type of reading, one embodiment of the invention adds two additional lines of vertical (in text coordinates) context. In FIG. 1, line 102 realizes a constant look-ahead and the line 103 realizes a constant look-back in the read text. This concept is illustrated in FIG. 1 and also in FIG. 2, which shows the text 200 displayed by the display device 100. Consider the three paragraphs in FIG. 2, left and right sides. The framed boxes 201-206 denote which portions of the text are shown as the context above (203), context below (202) and the focus reading area (201) (left figure). It should be noted that the corresponding context is displayed on the display 100 as show in FIG. 1. As the reader scrolls through the text, the context areas and focus area slide through the text while retaining a constant offset (see context areas 204, 205 and 206), which can be similarly displayed on the device 100 at a later time. The actual offset between the three context areas can be made configurable by the user. The position of the focused text in the paragraph is indicated in the system shown in FIG. 1 by using text position indicators 104 and 105. The lengths of such indicators 104 and 105 indicate the offset of the displayed text from the beginning and the end of the paragraph, respectively.

In another embodiment, the inventive device retains vertical (in text coordinates) scrolling as follows. The font size and text width is chosen to optimally fit the display diagonal and the current line of text is displayed along that diagonal. The preceding and succeeding context lines are displayed such that the beginnings of the lines are aligned with the upper and lower left edges of the display and slide along these edges as they scroll up or down. The right ends of the text lines above and below the focus line may be clipped to the device's display. Furthermore, the font size may be scaled down dynamically as text lines scroll away from the focus line, or scaled up as they scroll towards the focus line. A side effect of this arrangement is that the "carriage return" for the eyes of the reader is reduced from the focus line to the context line above or below. Furthermore, color gradations may be used to visually emphasize the focus line over the context lines. Additional vertical (in text coordinates) context information may be added by bars or similar renderings as also shown in FIG. 1 which symbolize how far the reader has progressed through the text. In this example, the lengths of bars are changed proportionally to the amount of text above and below the focus line.

The horizontal (in text coordinates) and vertical (in text coordinates) scrolling can be combined to work in a complementary fashion.

Obviously, the role of the left and right edges is reversed in implementations that are geared towards users with writings systems that layout text right to left. The roles of edges may be changed accordingly for writing system in which text is laid out top to bottom. These modifications are straightforward to see for those schooled in the art.

Figure 5:
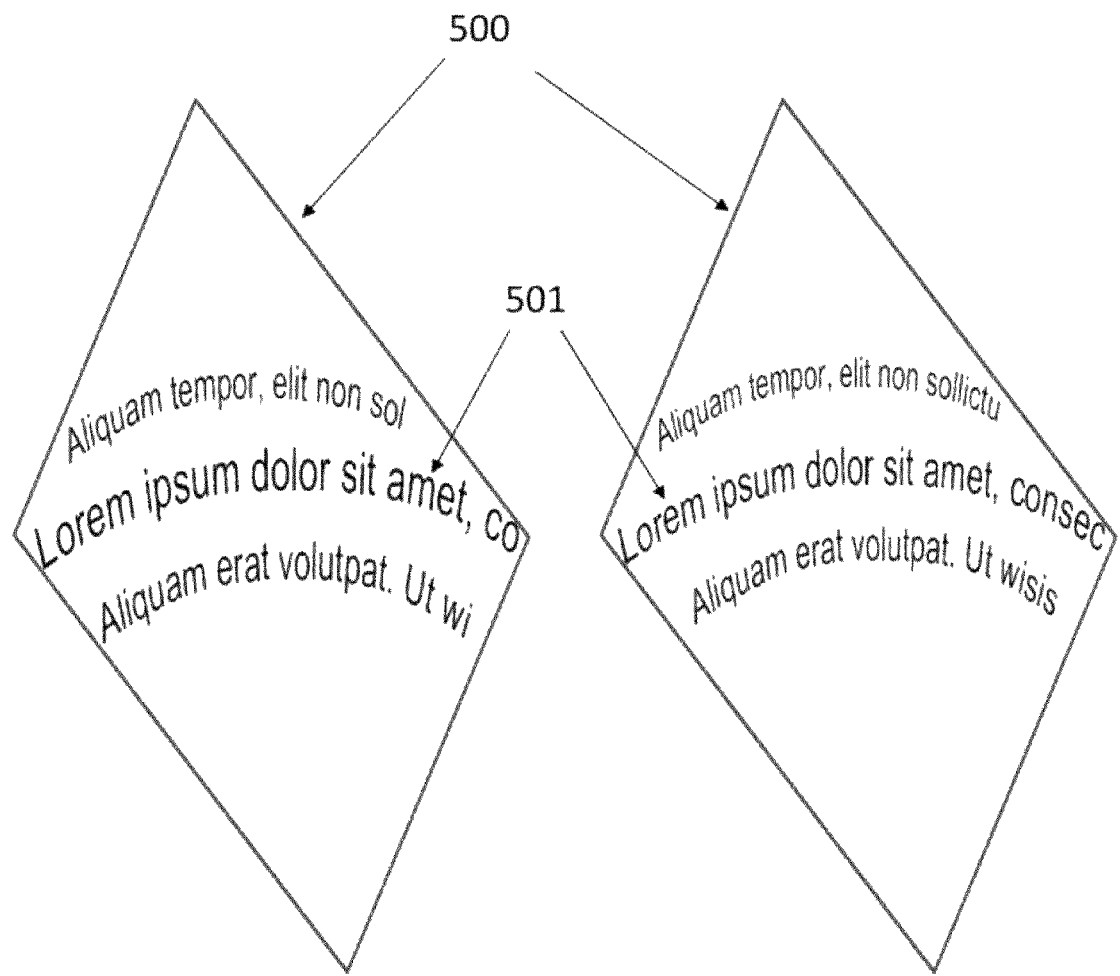
FIG. 5 illustrates text oriented in a slightly curved diagonal focus line, according to one embodiment of the invention.

In yet another embodiment of a display device 500 illustrated in FIG. 5, the diagonal focus line 501 is bent such that it is slightly curved along the top left and top right edges. The human eyes are capable of compensating for the curvature up to a certain degree without too much loss of comfort. At the same time, additional length along the focus line 501 is gained, which can be used to increase the font size even further while retaining the same number of characters per line, or to increase the number of characters per line without sacrificing font size.

It should be noted that the display device and the corresponding method described herein are not limited to mobile devices or even devices with small screen. The inventive techniques may be applied to rendering textual and/or numerical information on any type or variety of display device implemented using any known or later developed technology. The described reading mode of the display device may be automatically enabled when the handheld device senses that the user, for example, positioned the device in the diagonal manner shown in FIG. 1.

Exemplary Embodiment

For text that is available in its character-based machine-interpretable text form, one exemplary embodiment is the first embodiment illustrated in FIG. 1.

For text that is available in bitmapped form e.g. because the text as been previously rendered or scanned, a segmentation process can be performed and the bitmapped text can be broken down into rectangular segments of lines or words. The displayed segments are then re-arranged and rotated in a fashion that allows to stitch the segments together diagonally for scrolling along the device's display diagonal. The necessary image processing and image analysis algorithms are simple and widely known particularly to those skilled in the art.

A scrolling device for a computer may include a touch-sensitive surface, which may be elongated and/or have one or more active regions. Scrolling may be performed in manual as well as automated ways that may result in more accurate and efficient scrolling. Scrolling, as displayed on the screen, may further be rounded to the nearest document text line and/or distance unit, even though a more precise scrolling location value may be stored and/or tracked.

Exemplary Computer Platform

Figure 3:
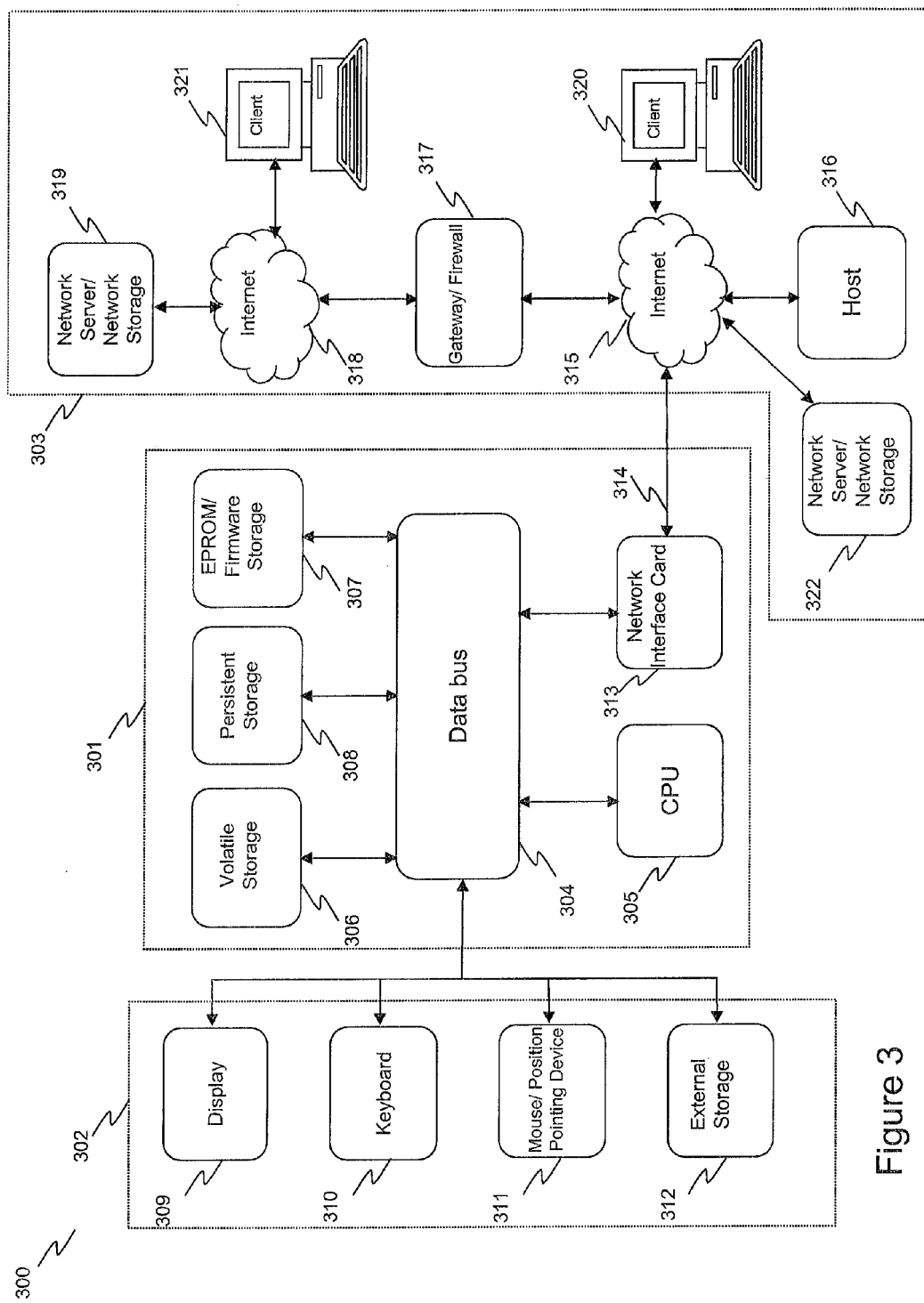
FIG. 3 illustrates an exemplary embodiment of a computer platform upon which the inventive system may be implemented.

FIG. 3 is a block diagram that illustrates an embodiment of a computer/server system 300 upon which an embodiment of the inventive methodology may be implemented. The system 300 includes a computer/server platform 301, peripheral devices 302 and network resources 303.

The computer platform 301 may include a data bus 304 or other communication mechanism for communicating information across and among various parts of the computer platform 301, and a processor 305 coupled with bus 301 for processing information and performing other computational and control tasks. Computer platform 301 also includes a volatile storage 306, such as a random access memory (RAM) or other dynamic storage device, coupled to bus 304 for storing various information as well as instructions to be executed by processor 305. The volatile storage 306 also may be used for storing temporary variables or other intermediate information during execution of instructions by processor 305. Computer platform 301 may further include a read only memory (ROM or EPROM) 307 or other static storage device coupled to bus 304 for storing static information and instructions for processor 305, such as basic input-output system (BIOS), as well as various system configuration parameters. A persistent storage device 308, such as a magnetic disk, optical disk, or solid-state flash memory device is provided and coupled to bus 301 for storing information and instructions.

Computer platform 301 may be coupled via bus 304 to a display 309, such as a cathode ray tube (CRT), plasma display, or a liquid crystal display (LCD), for displaying information to a system administrator or user of the computer platform 301. An input device 310, including alphanumeric and other keys, is coupled to bus 301 for communicating information and command selections to processor 305. Another type of user input device is cursor control device 311, such as a mouse, a trackball, or cursor direction keys for communicating direction information and command selections to processor 304 and for controlling cursor movement on display 309. This input device typically has two degrees of freedom in two axes, a first axis (e.g., x) and a second axis (e.g., y), that allows the device to specify positions in a plane.

An external storage device 312 may be connected to the computer platform 301 via bus 304 to provide an extra or removable storage capacity for the computer platform 301. In an embodiment of the computer system 300, the external removable storage device 312 may be used to facilitate exchange of data with other computer systems.

The invention is related to the use of computer system 300 for implementing the techniques described herein. In an embodiment, the inventive system may reside on a machine such as computer platform 301. According to one embodiment of the invention, the techniques described herein are performed by computer system 300 in response to processor 305 executing one or more sequences of one or more instructions contained in the volatile memory 306. Such instructions may be read into volatile memory 306 from another computer-readable medium, such as persistent storage device 308. Execution of the sequences of instructions contained in the volatile memory 306 causes processor 305 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 305 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 308. Volatile media includes dynamic memory, such as volatile storage 306. Transmission media includes coaxial cables, copper wire and fiber optics, including the wires that comprise data bus 304.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on the data bus 304. The bus 304 carries the data to the volatile storage 306, from which processor 305 retrieves and executes the instructions. The instructions received by the volatile memory 306 may optionally be stored on persistent storage device 308 either before or after execution by processor 305. The instructions may also be downloaded into the computer platform 301 via Internet using a variety of network data communication protocols well known in the art.

The computer platform 301 also includes a communication interface, such as network interface card 313 coupled to the data bus 304. Communication interface 313 provides a two-way data communication coupling to a network link 314 that is connected to a local network 315. For example, communication interface 313 may be an integrated services digital network (ISDN) card or a modem to provide a data communication connection to a corresponding type of telephone line. As another example, communication interface 313 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 313 sends and receives electrical, electromagnetic or optical signals that carry digital data streams representing various types of information.

Network link 313 typically provides data communication through one or more networks to other network resources. For example, network link 314 may provide a connection through local network 315 to a host computer 316, or a network storage/server 317. Additionally or alternatively, the network link 313 may connect through gateway/firewall 317 to the wide-area or global network 318, such as an Internet. Thus, the computer platform 301 can access network resources located anywhere on the Internet 318, such as a remote network storage/server 319. On the other hand, the computer platform 301 may also be accessed by clients located anywhere on the local area network 315 and/or the Internet 318. The network clients 320 and 321 may themselves be implemented based on the computer platform similar to the platform 301.

Local network 315 and the Internet 318 both use electrical, electromagnetic or optical signals that carry digital data streams. The signals through the various networks and the signals on network link 314 and through communication interface 313, which carry the digital data to and from computer platform 301, are exemplary forms of carrier waves transporting the information.

Computer platform 301 can send messages and receive data, including program code, through the variety of network(s) including Internet 318 and LAN 315, network link 314 and communication interface 313. In the Internet example, when the system 301 acts as a network server, it might transmit a requested code or data for an application program running on client(s) 320 and/or 321 through Internet 318, gateway/firewall 317, local area network 315 and communication interface 313. Similarly, it may receive code from other network resources.

The received code may be executed by processor 305 as it is received, and/or stored in persistent or volatile storage devices 308 and 306, respectively, or other non-volatile storage for later execution. In this manner, computer system 301 may obtain application code in the form of a carrier wave.

Figure 4:
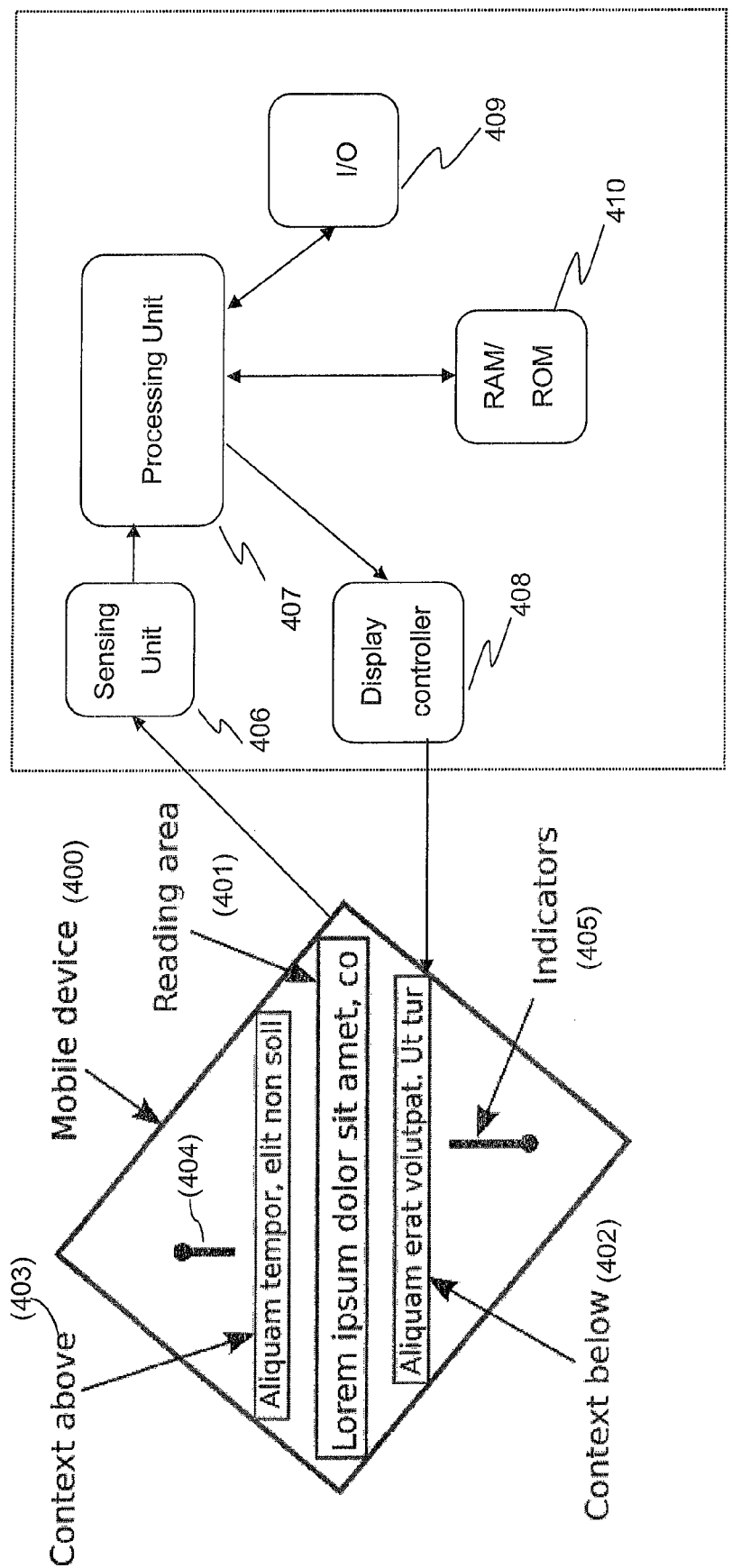
FIG. 4 illustrates an example functional diagram of how the present invention relates to the computer platform.

FIG. 4 illustrates an example functional diagram of how the present invention relates to the computer platform.

We present an example of how one of the embodiments of the present invention relates to the computer platform. When the user inputs a command into the device through a tactile interaction, such as a gesture, on the device, the tactile interaction is received by the display 400 containing a sensing unit 406. The sensing unit senses the tactile interaction to the display. This information is then sent to a processing unit 407 which processes the information and interprets the command that the user had inputted through the tactile interaction. For example, if the tactile interaction is a command to initiate the diagonal text display, the processing unit will process those instructions and forward it to the display controller 408, which then proceeds to render text on the display in parallel to a diagonal of the display. If the user inputs a command for scrolling the text, the processor will process the instruction, and forward it to the display controller, which then proceeds to scroll the text as the user desires. Of course, the computer platform is not limited to receiving commands by tactile interaction; other I/O devices 409 as previously described may be attached to the computer platform for inputting commands for the processing unit.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive display device. It is intended that the specification and examples be considered as exemplary only, with a true scope and spirit of the invention being indicated by the following claims.

What is claimed is:

1. A method comprising:
   rendering text for display on a display device, wherein the text is rendered on the display device parallel to a diagonal of the display device such that the text is oriented in a same direction as the diagonal; and
   rendering a look ahead context and a look-back context for display on the display device,
   wherein the diagonal spans from a first intersection of two edges of the display device to a second intersection of two edges of the display device, the first intersection being non-adjacent to the second intersection.

2. The method of claim 1, further comprising scrolling the rendered text along the diagonal of the display device.

3. The method of claim 1, wherein the look ahead context and the look-back context are rendered in fonts having at least one different font characteristic.

4. The method of claim 3, wherein the at least one different font characteristic is a font size.

5. The method of claim 1, wherein the text, the look ahead context and the look-back context are scrolled to maintain a constant offset between the text and the look ahead context and the look-back context.

6. The method of claim 1, wherein the display device is a handheld mobile device.

7. The method of claim 1, wherein the text is rendered such that a height of the text is orthogonal to the diagonal.

8. A method comprising:
   rendering text for display on a display device, wherein the text is rendered on the display device along a curved line spanning diagonally across the display device such that the text is oriented substantially in a same direction as the curved line, and rendering a look ahead context and a look-back context for display on the display device,
   wherein the curved line spans from a first intersection of two edges of the display device to a second intersection of two edges of the display device, the first intersection being non-adjacent to the second intersection.

9. A non-transitory computer readable medium embodying a set of instructions, the set of instructions, when executed by one or more processors causing the one or more processors to render text for display on a display device, wherein the text is rendered on the display device parallel to a diagonal of the display device such that the text is oriented in a same direction as the diagonal; and to render a look ahead context and a look-back context for display on the display device, wherein the diagonal spans from a first intersection of two edges of the display device to a second intersection of two edges of the display device, the first intersection being non-adjacent to the second intersection.

10. The computer readable medium of claim 9, wherein the computer readable medium further comprises instructions for scrolling the rendered text along the diagonal of the display device.

11. The computer readable medium of claim 9, wherein the look ahead context and the look-back context are rendered in fonts having at least one different font characteristic.

12. The computer readable medium of claim 11, wherein the at least one different font characteristic is a font size.

13. The computer readable medium of claim 9, wherein the computer readable medium further comprises instructions for scrolling the text, the look ahead context and the look-back context to maintain a constant offset between the text and the look ahead context and the look-back context.

14. The computer readable medium of claim 9, wherein the display device is a handheld mobile device.

15. A non-transitory computer readable medium embodying a set of instructions, the set of instructions, when executed by one or more processors causing the one or more processors to render text for display on a display device, wherein the text is rendered on the display device along a curved line spanning diagonally across the display device such that the text is oriented substantially in a same direction as the curved line, and to render a look ahead context and a look-back context for display on the display device, wherein the curved line spans from a first intersection of two edges of the display device to a second intersection of two edges of the display device, the first intersection being non-adjacent to the second intersection.

16. The computer readable medium of claim 15, wherein the display device is a handheld mobile device.

17. A computerized system comprising:
a. a display device;
b. a central processing unit; and
c. a memory storing a set of instructions, the set of instructions, when executed by the central processing unit causing the central processing unit to render text for display on a display device, wherein the text is rendered on the display device parallel to a diagonal of the display device such that the text is oriented in a same direction as the diagonal; wherein the memory further stores instructions for rendering a look ahead context and a look-back context for display on the display device, wherein the diagonal spans from a first intersection of two edges of the display device to a second intersection of two edges of the display device, the first intersection being non-adjacent to the second intersection.

18. The computer system of claim 17, wherein the memory further stores instructions for scrolling the rendered text along the diagonal of the display device.

19. The computer system of claim 17, wherein the look ahead context and the look-back context are rendered in fonts having at least one different font characteristic.

20. The computer system of claim 19, wherein the at least one different font characteristic is a font size.

21. The computer system of claim 17, wherein the computer readable medium further comprises instructions for scrolling the text, the look ahead context and the look-back context to maintain a constant offset between the text and the look ahead context and the look-back context.

22. The computerized system of claim 17, wherein the display device is a handheld mobile device.

23. A computerized system comprising:
a. a display device;
b. a central processing unit; and
c. a memory storing a set of instructions, the set of instructions, when executed by one or more processors causing the one or more processors to render text for display on the display device, wherein the text is rendered on the display device along a curved line spanning diagonally across the display device such that the text is oriented substantially in a same direction as the curved line, wherein the memory further stores instructions for rendering a look ahead context and a look-back context for display on the display device, wherein the curved line spans from a first intersection of two edges of the display device to a second intersection of two edges of the display device, the first intersection being non-adjacent to the second intersection.

24. The computerized system of claim 23 wherein the display device is a handheld mobile device.

25. A mobile device, comprising:
a. a display;
b. a sensing unit operable to sense a user input;
c. a processing unit operable to process the user input; and
d. a display controller, rendering text on the display device parallel to a diagonal of the display such that the text is oriented in a same direction as the diagonal; wherein the display controller further renders a look ahead context and a look-back context for display on the display device; wherein the diagonal spans from a first intersection of two edges of the display device to a second intersection of two edges of the display device, the first intersection being non-adjacent to the second intersection.

* * * * *